United States Patent
Bryant et al.

(10) Patent No.: US 10,138,415 B2
(45) Date of Patent: Nov. 27, 2018

(54) FAR-FIELD DIVERSION WITH PULSED PROPPANT IN SUBTERRANEAN FRACTURING OPERATIONS

(71) Applicant: Halliburton Energy Services, Inc., Houston, TX (US)

(72) Inventors: Jason E. Bryant, Spring, TX (US); Thomas Donovan Welton, Conroe, TX (US); Ubong Inyang, Humble, TX (US); Jeremy Butler, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 224 days.

(21) Appl. No.: 15/116,315

(22) PCT Filed: Mar. 6, 2014

(86) PCT No.: PCT/US2014/021121
§ 371 (c)(1),
(2) Date: Aug. 3, 2016

(87) PCT Pub. No.: WO2015/134022
PCT Pub. Date: Sep. 11, 2015

(65) Prior Publication Data
US 2017/0009129 A1 Jan. 12, 2017

(51) Int. Cl.
*E21B 43/267* (2006.01)
*C09K 8/62* (2006.01)
(Continued)

(52) U.S. Cl.
CPC ............ *C09K 8/80* (2013.01); *C09K 8/516* (2013.01); *C09K 8/68* (2013.01); *C09K 8/70* (2013.01);
(Continued)

(58) Field of Classification Search
CPC ......... E21B 43/26; E21B 43/267; C09K 8/62; C09K 8/64; C09K 8/66; C09K 8/68; C09K 8/80
See application file for complete search history.

(56) References Cited

U.S. PATENT DOCUMENTS

| | | | |
|---|---|---|---|
| 4,887,670 A | 12/1989 | Lord et al. | |
| 5,799,734 A * | 9/1998 | Norman | C09K 8/62 166/177.5 |

(Continued)

FOREIGN PATENT DOCUMENTS

WO 2010021563 A1 2/2010

OTHER PUBLICATIONS

Office Action issued in related CA Application No. 2933487, dated Mar. 29, 2017 (4 pages).
(Continued)

*Primary Examiner* — Kenneth L Thompson
(74) *Attorney, Agent, or Firm* — Craig Roddy; Baker Botts L.L.P.

(57) ABSTRACT

Systems and methods that use far-field diverting agents and proppant pulsing to enhance fracture geometries in far field areas of a subterranean formation are provided. In one embodiment, the methods comprise: introducing into a well bore penetrating a portion of a subterranean formation alternating stages of a proppant-carrying fracturing fluid comprising a plurality of proppant particulates, and a clean fracturing fluid comprising a lesser concentration of proppant particulates than the proppant-carrying fracturing fluid, wherein the alternating stages of the proppant-carrying fracturing fluid and the clean fracturing fluid are introduced into the well bore at or above a pressure sufficient to create or enhance one or more fractures in the subterranean formation; and introducing a diverting agent into the well bore
(Continued)

during one or more of the alternating stages of proppant-carrying fracturing fluid and clean fracturing fluid.

18 Claims, 4 Drawing Sheets

(51) Int. Cl.
| | |
|---|---|
| *C09K 8/80* | (2006.01) |
| *C09K 8/516* | (2006.01) |
| *C09K 8/70* | (2006.01) |
| *C09K 8/92* | (2006.01) |
| *C09K 8/68* | (2006.01) |
| *E21B 43/26* | (2006.01) |

(52) U.S. Cl.
CPC .............. *C09K 8/92* (2013.01); *E21B 43/26* (2013.01); *E21B 43/267* (2013.01)

(56) References Cited

U.S. PATENT DOCUMENTS

| | | | | |
|---|---|---|---|---|
| 5,875,843 A * | 3/1999 | Hill | .................. | E21B 43/26 166/250.1 |
| 7,273,104 B2 * | 9/2007 | Wilkinson | .............. | E21B 43/26 166/305.1 |
| 7,934,556 B2 * | 5/2011 | Clark | ...................... | E21B 43/14 166/250.01 |
| 8,162,048 B2 * | 4/2012 | Termine | ................... | C09K 8/66 166/250.01 |
| 9,085,975 B2 * | 7/2015 | Abad | ...................... | E21B 43/26 |
| 2002/0023752 A1 | 2/2002 | Qu et al. | | |
| 2004/0261996 A1 * | 12/2004 | Munoz, Jr. | ............. | C09K 8/516 166/279 |
| 2006/0042797 A1 | 3/2006 | Fredd et al. | | |
| 2006/0175059 A1 | 8/2006 | Sinclair et al. | | |
| 2007/0114022 A1 * | 5/2007 | Nguyen | ............... | C09K 8/5083 166/250.1 |
| 2013/0255953 A1 | 10/2013 | Tudor | | |
| 2014/0174737 A1 | 6/2014 | Reddy et al. | | |
| 2015/0075797 A1 * | 3/2015 | Jiang | .................... | E21B 43/283 166/307 |

OTHER PUBLICATIONS

International Search Report and Written Opinion issued in related PCT Application No. PCT/US2014/021121 dated Dec. 5, 2014, 18 pages.

Cortez, Janette, and B. R. Reddy. "Activator Development for Controlling Degradation Rates of Polymeric Degradable Diverting Agents." SPE Paper 164117, SPE International Symposium on Oilfield Chemistry. Society of Petroleum Engineers, 2013.

* cited by examiner

FAR-FIELD DIVERSION WITH PULSED PROPPANT IN SUBTERRANEAN FRACTURING OPERATIONS

CROSS-REFERENCE TO RELATED APPLICATION

The present application is a U.S. National Stage Application of International Application No. PCT/US2014/021121 filed Mar. 6, 2014, which is incorporated herein by reference in its entirety for all purposes.

BACKGROUND

The present disclosure relates to systems and methods for use in subterranean fracturing operations, and more specifically, systems and methods that may provide enhanced fracture geometries in far field areas of a subterranean formation.

In the production of hydrocarbons from a subterranean formation, the subterranean formation should be sufficiently conductive to permit the flow of desirable fluids to a well bore penetrating the formation. One type of treatment used in the art to increase the conductivity of a subterranean formation is hydraulic fracturing. Hydraulic fracturing operations generally involve pumping a treatment fluid (e.g., a fracturing fluid or a "pad fluid") into a well bore that penetrates a subterranean formation at or above a sufficient hydraulic pressure to create or enhance one or more pathways, or "fractures," in the subterranean formation. These fractures generally increase the permeability and/or conductivity of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore.

Generally, fracturing treatment in a rock formation can create single fractures which extend from opposing sides of the wellbore, i.e., a bi-wing fracture. However, it may not be feasible to create such fractures in many carboniferous formations, such as shales, clays, and/or coal beds. These carboniferous formations typically have finely laminated structures that are easily broken down into pieces. Therefore, creating an effective fracture network in these formations is not always feasible using conventional fracturing methods.

In other fracturing treatments, proppant particulates may be introduced into a subterranean formation by sequentially injecting into the well bore alternating stages of carrier fluids carrying different amounts of proppant. These methods have been described as forming "pillars" of proppant in the open space of a fracture and flow channels between those pillars which may optimize the conductivity of the fracture.

BRIEF DESCRIPTION OF THE FIGURES

These drawings illustrate certain aspects of some of the embodiments of the present disclosure, and should not be used to limit or define the disclosure.

Figure 1:
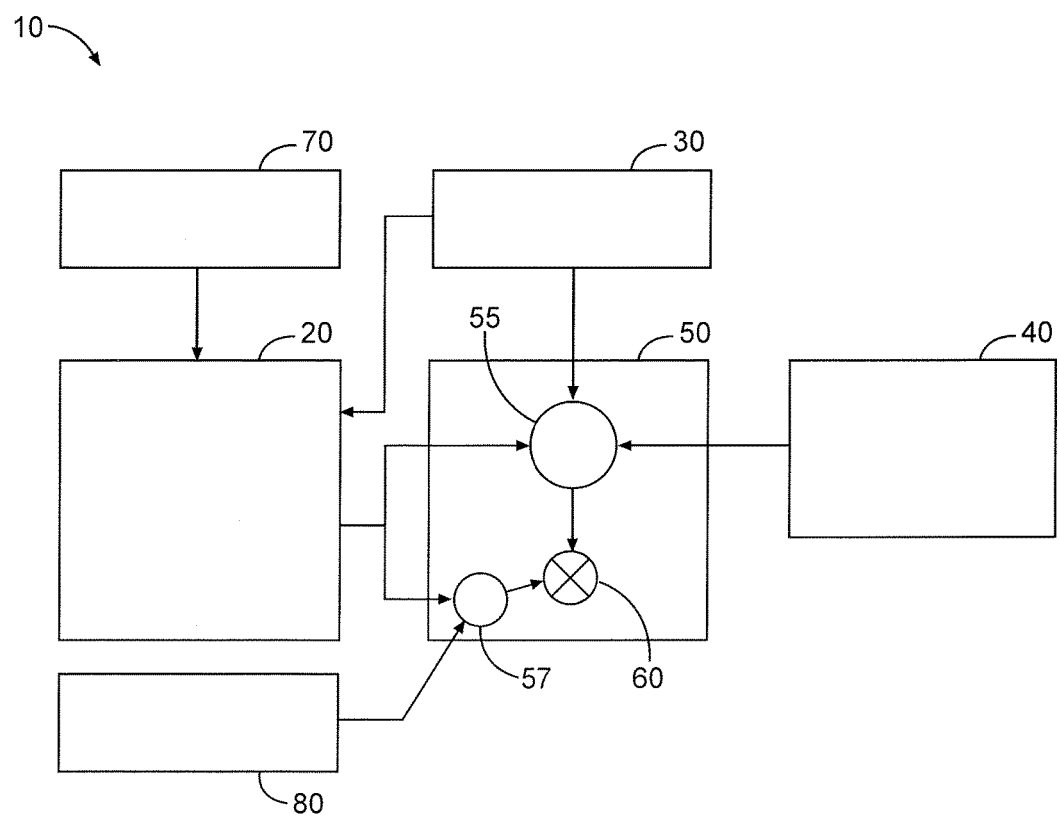
FIG. 1 is a diagram illustrating an example of a fracturing system that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to systems and methods for use in subterranean fracturing operations, and more specifically, systems and methods that provide enhanced fracture geometries in far field areas of a subterranean formation.

More specifically, the present disclosure provides fracturing systems and methods that introduce alternating stages of proppant-carrying fracturing fluid and "clean" fracturing fluid (e.g., spacer fluids) into a subterranean formation interspersed with one or more diverting agents. As used herein, "clean" fracturing fluid refers to a fluid that comprises a lesser concentration of proppant than the proppant-carrying fracturing fluid (although a "clean" fracturing fluid may still comprise other materials and/or additives such as diverting agents). Alternating introduction of the aforementioned fluids may be achieved, in some embodiments, through a fluid pumping strategy such as pump cycling. In certain embodiments, the diverting agent may be introduced while alternating stages of proppant-carrying fracturing fluid and "clean" fracturing fluid are introduced into the formation. In other embodiments, the diverting agent(s) may be introduced into the fracturing fluid and/or the formation in one or more pulses that alternate and/or overlap with the alternating stages of proppant (e.g., proppant-diverting agent-proppant). In still other embodiments, some combination of these patterns may be used. The cycles of alternating stages of proppant-carrying fracturing fluid and "clean" fracturing fluid may vary in weight and/or density, and may induce cycles or other variations of hydrostatic pressure exerted on the formation as the fluids are introduced. This may, among other benefits, enable the creation and/or enhancement of more varied fracture geometries and patterns (e.g., secondary/tertiary fractures, branched fractures, dendritic fractures, etc.) in the formation.

The methods and compositions of the present disclosure may, among other things, enable the creation and/or enhancement of one or more conductive channels and/or enhanced fracture geometries in the far-field area of a subterranean formation. This enables more effective stimulation (e.g., fracturing) of certain types of tight formations, such as shales, clays, coal beds, and/or gas sands. As used herein, a "far-field" area of a subterranean formation generally refers to an area of the formation that is significantly distanced from the well bore and extends beyond the portion of the formation that may be compromised or damaged by the drilling of the well bore. In certain embodiments, the far-field area may refer to the area of a formation that is from about 10 feet to 3000 feet from the well bore. In certain embodiments, the far-field area may refer to the area of a formation that is about 100 feet or more from the well bore. In certain embodiments, the far-field area may refer to the area of a formation that is from about 100 feet to 1000 feet from the well bore.

The fracturing fluids used in the methods and systems of the present disclosure may comprise any base fluid known in the art, including aqueous fluids, non-aqueous fluids, gases, or any combination thereof. Aqueous fluids that may be suitable for use in the methods and systems of the present disclosure may comprise water from any source, provided that it does not contain compounds that adversely affect other components of the fracturing fluid. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of gelling agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

The proppants used in the methods and systems of the present disclosure may comprise any particulate capable of being deposited in one or more of the fractures in the formation (whether created, enhanced, and/or pre-existing). Examples of proppant particulates that may be suitable for use include, but are not limited to: bubbles or microspheres, such as made from glass, ceramic, polymer, sand, and/or another material. Other examples of proppant particulates may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof. In certain embodiments, the proppant particulates may be at least partially coated with one or more substances such as tackifying agents, silyl-modified polyamide compounds, resins, crosslinkable aqueous polymer compositions, polymerizable organic monomer compositions, consolidating agents, binders, or the like.

The proppant particulates may be of any size and/or shape suitable for the particular application in which they are used. In certain embodiments, the proppant particulates used may have a particle size in the range of from about 2 to about 400 mesh, U.S. Sieve Series. In certain embodiments, the proppant may comprise graded sand having a particle size in the range of from about 10 to about 70 mesh, U.S. Sieve Series. Preferred sand particle size distribution ranges may be one or more of 10-20 mesh, 20-40 mesh, 30-50 mesh, 40-60 mesh or 50-70 mesh, depending on, for example, the fracture geometries of the formation, the location in the formation where the proppant particulates are intended to be placed, and other factors. In certain embodiments, a combination of proppant particulates having different particle sizes, particle size distributions, and/or average particle sizes may be used. In certain embodiments, proppant particulates of different particle sizes, particle size distributions, and/or average particle sizes may be used in different stages of proppant-carrying fluid in a single fracturing operation. For example, earlier stages of proppant-carrying fluid may include smaller proppant particulates that can enter the narrower tip regions of fractures in the formation, while larger proppant particulates may be used in subsequent stages that may be deposited in the fracture without approaching the tip regions.

Proppants may be included in the proppant-carrying fracturing fluid in any suitable concentration. In certain embodiments, the concentration of particulates in the proppant-carrying fracturing fluid may range from about 0.1 to about 8 lb/gal. In other embodiments, it may range from about 0.5 to about 5.0 lb/gal, and in some embodiments, from about 1.5 to about 2.5 lb/gal. In some embodiments, the concentration of particulates in the proppant-carrying fluid may have an approximate lower range of any one of: 0.5, 0.6, 0.7, 0.8, 0.9, 1.0, 1.1, 1.2, 1.3, 1.4, 1.5, 1.6, 1.7, 1.8, 1.9, and 2.0 lb/gal; and an upper range of approximately any one of: 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5 lb/gal, and so on up to 8.0 lb/gal in increments of 0.1 lb/gal. Thus, the concentration range of particulates of some example embodiments may be from about 0.5 lb/gal to about 1.0 lb/gal, or from about 1.0 lb/gal to about 4.4 lb/gal, or from about 2.0 lb/gal to about 2.5 lb/gal, and so on, in any combination of any one of the upper and any one of the lower ranges recited above (including any 0.1 lb/gal increment between 4.5 and 8.0 lb/gal). A person of skill in the art with the benefit of this disclosure will recognize the appropriate amount of proppants to use in an application of the present disclosure based on, among other things, the type of formation, the particle size of the proppant, the parameters of the fracturing operation, fracture geometries, and the like. The "clean" fracturing fluid generally comprises a lesser concentration of proppant than the proppant-carrying fracturing fluid. In certain embodiments, a "clean" fracturing fluid may be a fluid that is substantially free of proppant and/or does not comprise a significant concentration of proppant, although in other embodiments a "clean" fracturing fluid may comprise some significant concentration of proppant.

The diverting agents used in the methods and systems of the present disclosure may comprise any particulate material capable of altering some or all of the flow of a substance away from a particular portion of a subterranean formation to another portion of the subterranean formation or, at least in part, ensure substantially uniform injection of a treatment fluid (e.g., a fracturing fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced fracturing fluid into the less permeable portions of the formation. Examples of particulate diverting materials that may be suitable for use in certain embodiments of the present disclosure may include, but are not limited to, naphthalene, clean tar, starch, moth balls, naphthalinic flakes, wax beads, boric oxide; derivatives of the foregoing; and combinations of any of the foregoing. In certain embodiments, the proppants used in the methods and systems of the present disclosure may serve a dual purpose as both a proppant particulate (i.e., preventing fractures from fully closing upon the release of the hydraulic pressure, forming conductive channels through which fluids may flow to a well bore) and as a diverting agent. Such dual-purpose particulates may be referred to herein as "self-diverting" proppants.

In certain embodiments, a diverting agent's diverting effects may be temporary. For example, a degradable and/or soluble diverting agent may be used such that it degrades or dissolves, for example, after a period of time in the subterranean formation or when contacted by a particular fluid or fluids. Examples of degradable diverting agents that may be suitable for use in certain embodiments of the present disclosure include, but are not limited to, fatty alcohols, fatty acid salts, fatty esters, proteinous materials, degradable polymers, and the like. Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(acrylamide); poly(ortho esters); poly(amino acids); poly(ethylene oxide); and polyphosphazenes. Polyanhydrides are another type of degradable polymers that may be suitable for use as degradable diverting agents in the present disclosure. Examples of polyanhydrides that may be suitable include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

In certain embodiments, the diverting agents suitable for use in the methods and systems of the present disclosure may be of an appropriate size to enter the far-field area of a subterranean formation. Such diverting agents are referred to herein as "far-field diverting agents," or are sometimes referred to in the art as diverting agents for "complex fractures". In certain embodiments, the average particle size of the diverting agent may range from about 1 micron to about 600 microns. In certain embodiments, the average particle size of the diverting agent may be about 100 mesh, U.S. Sieve Series.

Diverting agents may be introduced into the subterranean formation in a fracturing fluid, and may be included in fracturing fluids in any suitable concentration. In certain embodiments, the diverting agents may be provided at the well site in a slurry that is mixed into the base fluid of the fracturing fluid as the fluid is pumped into a well bore. In certain embodiments, the concentration of diverting agent in the fracturing fluid may range from about 0.01 lbs per gallon to about 1 lbs per gallon. In certain embodiments, the concentration of diverting agent in the fracturing fluid may range from about 0.1 lbs per gallon to about 0.3 lbs per gallon. In certain embodiments, the total amount of diverting agent used for a particular stage of a fracturing operation may range from about 1000 lbs to about 5000 lbs. A person of skill in the art with the benefit of this disclosure will recognize the appropriate amount of diverting agent to use in an application of the present disclosure based on, among other things, the type of formation, the particle size of the diverting agent, the parameters of the fracturing operation, the desired fracture geometries, and the like.

In certain embodiments, the fracturing fluids used in the methods and systems of the present disclosure optionally may comprise one or more gelling agents, which may comprise any substance that is capable of increasing the viscosity of a fluid, for example, by forming a gel. In certain embodiments, the gelling agent may viscosify an aqueous fluid when it is hydrated and present at a sufficient concentration. Examples of gelling agents that may be suitable for use in accordance with the present disclosure include, but are not limited to guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the gelling agent may be "crosslinked" with a crosslinking agent, among other reasons, to impart enhanced viscosity and/or suspension properties to the fluid. The gelling agent may be included in any concentration sufficient to impart the desired viscosity and/or suspension properties to the aqueous fluid. In certain embodiments, the gelling agent may be included in an amount of from about 0.1% to about 10% by weight of the aqueous fluid. In other exemplary embodiments, the gelling agent may be present in the range of from about 0.1% to about 2% by weight of the aqueous fluid.

In certain embodiments, the fracturing fluids used in the methods and systems of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition, which may facilitate its incorporation into a fracturing fluid. In certain embodiments, the compositions of the present disclosure optionally may comprise one or more dispersants, among other reasons, to prevent flocculation and/or agglomeration of the solids while suspended in a slurry. Other examples of such additional additives include, but are not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The methods and systems of the present disclosure may be used during or in conjunction with any subterranean fracturing operation. For example, a fracturing fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. Other suitable subterranean operations in which the methods and/or compositions of the present disclosure may be used include, but are not limited to, fracture acidizing, "frac-pack" treatments, and the like.

The fracturing fluids used in the methods and systems of the present disclosure may be prepared using any suitable method and/or equipment (e.g., blenders, stirrers, etc.) known in the art at any time prior to their use. In some embodiments, the fracturing fluids may be prepared at a well site or at an offsite location. In certain embodiments, an aqueous fluid may be mixed the gelling agent first, among other reasons, in order to allow the gelling agent to hydrate and form a gel. Once the gel is formed, proppants and/or diverting agents may be mixed into the gelled fluid. Once prepared, a fracturing fluid of the present disclosure may be placed in a tank, bin, or other container for storage and/or transport to the site where it is to be used. In other embodiments, a fracturing fluid of the present disclosure may be prepared on-site, for example, using continuous mixing or "on-the-fly" methods, as described below.

In certain embodiments, the fracturing fluid may be pumped into the formation at pressure in alternating stages of proppant-carrying fluid and clean fracturing fluid, with one or more diverting agents interspersed in the stages of fluid. Alternating introduction of the aforementioned fluids may be achieved, in some embodiments, through a fluid pumping strategy such as pump cycling. Pump cycling may include any suitable means of accomplishing the alternating introduction of the stages fluids. In some embodiments, it may include alternating the fluid fed (e.g., alternating between feeding less-concentrated fluid and proppant-carrying fluid) into a single pump for pumping fracturing fluid downhole (e.g., down casing, tubing, and/or a wellbore penetrating a subterranean formation and then out into the subterranean formation). In other embodiments, it may include introducing the fracturing fluid comprising a lesser amount of particulates downhole via an annulus defined between the well bore and outer tubing or casing of the well and introducing proppant-carrying fluid down the tubing or casing, or vice-versa, for intermixing downhole. In certain embodiments, pump cycling may include using two or more pumps, each pumping a stage of fluid downhole in alternating succession. For example, where two pumps are used, a first pump fed by a reservoir of less-concentrated fluid may be cycled on, and then cycled off at substantially the same time that a second pump fed by a reservoir of particulate-laden fluid is cycled on. Then, the second pump may be cycled off at substantially the same time that the first pump is cycled back on again, and so on, such that the end result is the introduction of alternating stages of fluids into the subterranean formation. In some embodiments, a clean fracturing fluid may be continuously pumped into the subterranean formation for substantially the entire duration of a fracturing treatment, while proppant and/or a proppant-carrying fluid may be intermittently injected into the clean fracturing fluid, so as to result in alternating sequences of (i) a clean fracturing fluid and (ii) a proppant-carrying fracturing fluid being introduced into the wellbore and/or the subterranean formation. That is, proppant may be injected into the fluid by various means, including intermittent injection of dry particulates into the fracturing fluid, and/or intermittent injection of a proppant-carrying fluid into the fluid stream. In other embodiments, a continuous stream of proppant-carrying fluid may be pumped into the subterranean formation, with stages of a clean fracturing fluid injected into the concentrated fluid stream, achieving a similar effect of alternating sequences of proppant-carrying fluid and clean fracturing fluid introduced into the well bore and/or the subterranean formation. Thus, the stages of the fracturing fluid comprising a lesser amount of proppant and the proppant-carrying fluid may originate with the fluid reservoir, with the pump, and/or may be created by intermittent injection of particulate into a continuous stream of fluid (e.g., fracturing fluid), as hereinabove described.

The volumes of the alternating stages of proppant-carrying fluid and clean fluid (not including the pad fluid initially injected to initiate the primary fracture) may be any volumes appropriate for the particular application of the methods and systems of the present disclosure depending upon, for example, the type of formation, well bore volume, and other factors. In certain embodiments, the volume of each stage of clean fluid and/or proppant-carrying fluid may range from about 500 gallons to about 5000 gallons. In certain embodiments, the volume ratio of the stages of proppant-carrying fluid (i.e., slurry volume) to clean fluid may be about 1:1. However, a person of skill in the art with the benefit of this disclosure will understand when the volume ratios of the proppant-carrying fluid and clean fluid should be varied.

In certain embodiments of the methods and systems of the present disclosure, one or more additional fluids may be introduced into the well bore before, after, and/or concurrently with the fracturing fluid, for any number of purposes or treatments in the course of a fracturing operation. Examples of such fluids include, but are not limited to, preflush fluids, pad fluids, pre-pad fluids, acids, afterflush fluids, cleaning fluids, and the like. For example, a pad fluid may be pumped into the well bore prior to the alternating stages of proppant-carrying fracturing fluid and clean fracturing fluid. In certain embodiments, another volume of pad fluid may be pumped into the well bore after the diverting agent(s) are introduced into the formation, among other reasons, to initiate the creation of new fractures in the area of the formation to which the diverting agent diverts fluid. A person of skill in the art with the benefit of this disclosure will recognize the appropriate types of additional fluids to use, and when they may be used, in the methods and systems of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, a diverter source 80, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include proppant for combination with the fracturing fluid. The proppant source 40 may be equipped with appropriate metering devices (e.g., valves or and/or other similar mechanisms) that are capable of controlling whether or not proppant is dispensed (and the amount of proppant dispensed) into a first blender 55 in the pump and blender system 50 at different points in time during the fracturing job. The proppant source 40 also may include metering devices or other equipment capable of dispensing proppant in pulses or intervals so as to create alternating intervals of proppant-carrying fluid and "clean" fluid that are introduced into well 60. The diverter source 80 can include one or more diverting agents for combination with the fracturing fluid. The diverter source 80 may be equipped with appropriate metering devices (e.g., valves or and/or other similar mechanisms) that are capable of controlling whether or not diverting agents are dispensed (and the amount of diverting agents dispensed) into a second blender 57 in the pump and blender system 50 at different points in time during the fracturing job. For example, diverter source 80 and blender 57 may be capable of introducing diverting agent into the well 60 without using or interrupting the operation of proppant source 40 and blender 55, such that diverting agent may be introduced into well 60 separately while proppant from the proppant source 40 is introduced into the well bore at substantially the same time. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40, diverting agents from the diverter source 80, and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40, and/or diverter source 80 may be equipped with one or more metering devices (not shown) to control the flow of fluids, proppants, diverting agents, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide "clean" fracturing fluid into the well during certain stages, proppants during other stages, and combinations of those components at yet other stages.

Figure 2:
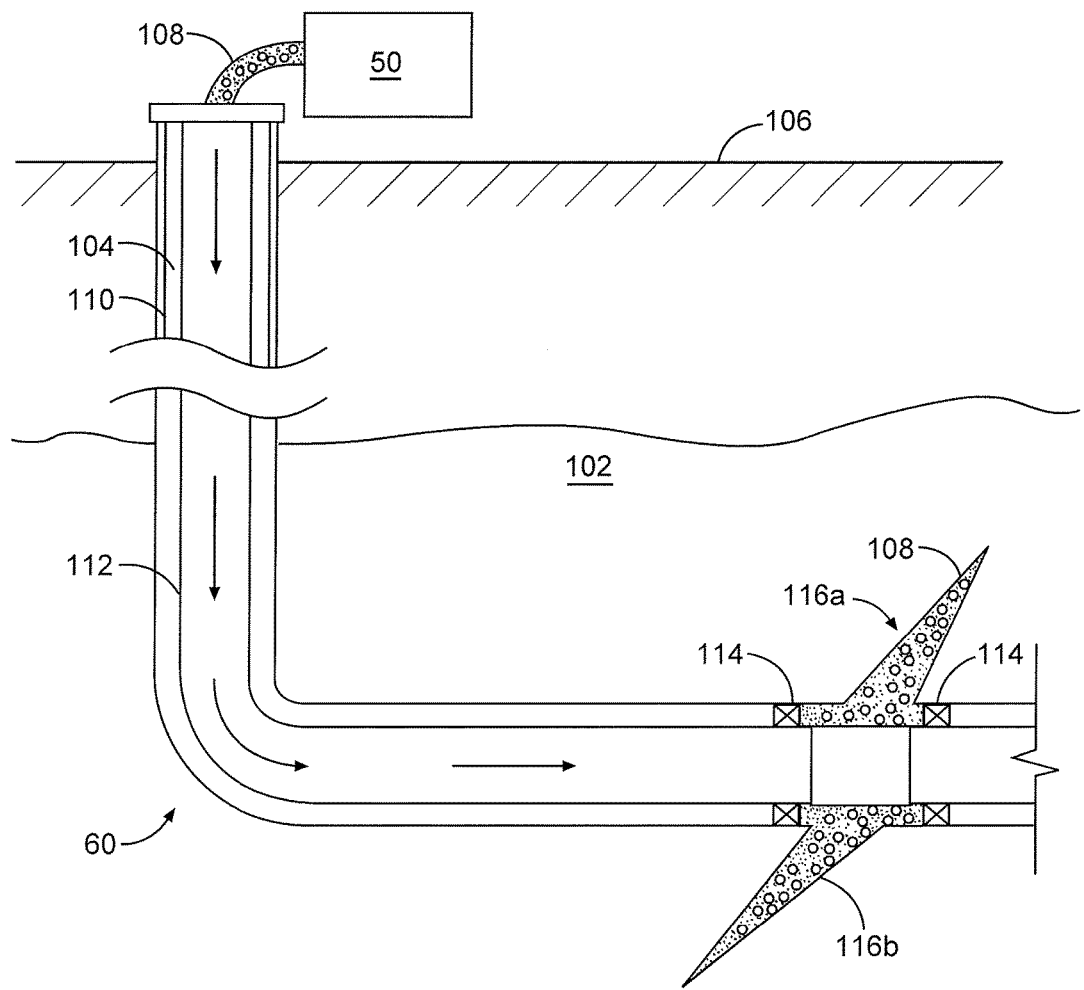
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Figure 3A:
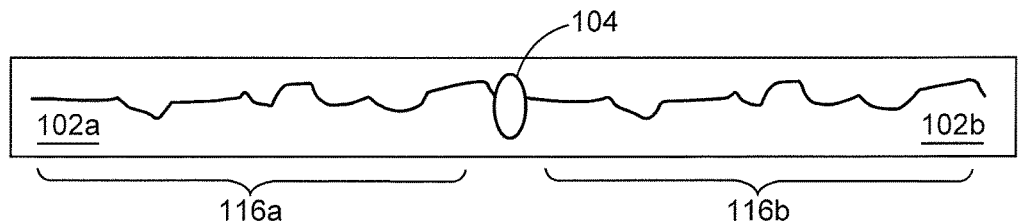
FIGS. 3A, 3B, and 3C are stylized diagrams of fractures extending from a wellbore in accordance with some aspects of the present disclosure.
Figure 3B:
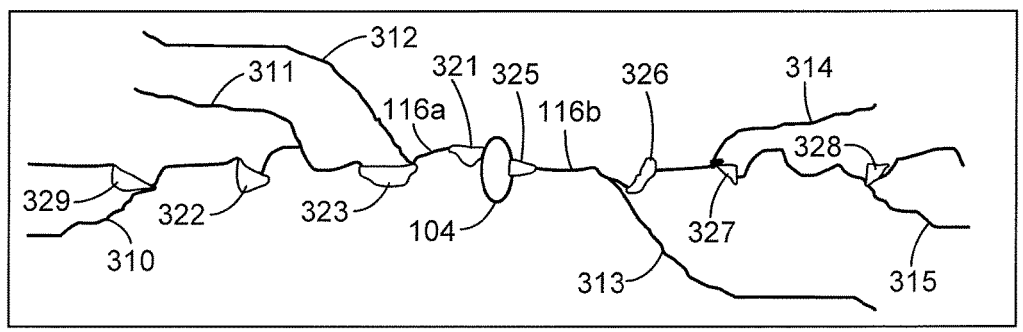
Figure 3C:
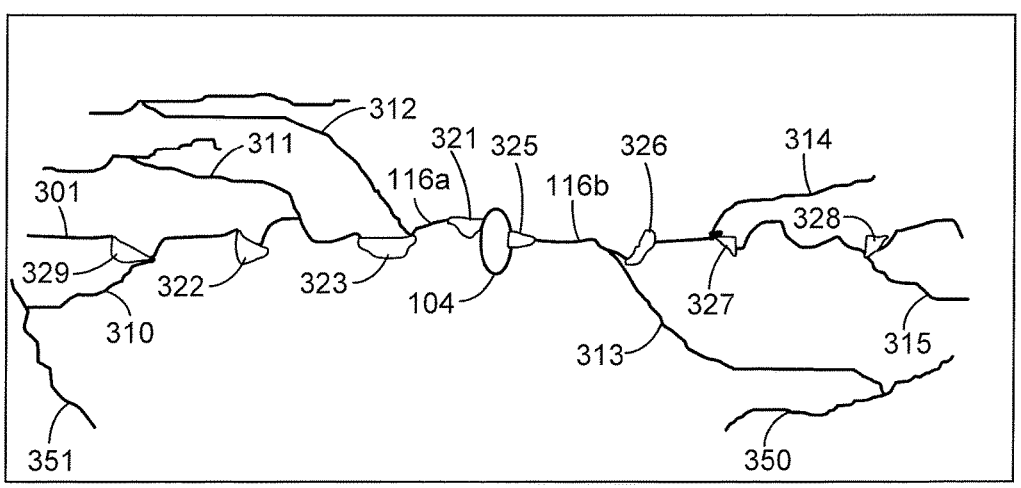

It is believed that when the diverting agent in the fracturing fluid reaches its desired location in the formation, it may "bridge" a space in one area of the formation (e.g., a portion of a fracture created therein) to divert fracturing fluid toward another area of the formation, for example, to create another portion of a fracture in a far-field area of the formation. "Bridging" a space, as used herein, means to at least temporarily prevent all or substantially all flow of a fluid or other substance into or out of the space. In certain embodiments, this phenomenon may be observed or indicated, among other ways, by detecting an abrupt increase in fluid pressure at the surface. Diverting effects according to the methods of some embodiments may be illustrated by reference to FIGS. 3A and 3B, which are stylized representations of fractures created in accordance with the methods of some embodiments. FIG. 3A depicts two fractures 116*a* and 116*b* extending from a well bore 104, according to a cross-sectional view looking down the wellbore 300. Such fractures may be created by a first stage of clean fracturing fluid in accordance with some embodiments. In FIGS. 3A, 3B, and 3C, the far field area of the formation is designated as areas 102*a* and 102*b*. FIG. 3B illustrates the creation of secondary or additional fractures 310, 311, 312, 313, 314, and 315, including fractures 310 and 315 in the far field areas of the formation, due to the action of deposits of diverting agent 321, 322, 323, 324, 325, 326, 327, and 328. In this example, a first stage of fracturing fluid may deposit diverting agent into the formation, resulting in, e.g., deposits 328 and 329, whereupon the subsequent second stage of fracturing fluid may be diverted by deposits 328 and 329 (e.g., where such deposits 328 and 329 bridge out the outlying portions of fractures 301 and 305) such that either or both stages create or enhance additional fractures 310 and 315.

The additional fractures 310 and 315 may in some instances connect fractures 116*a* and 116*b* with other pre-existing fractures, whether natural or previously created (not shown in FIG. 3B). FIG. 3C depicts an example according to some embodiments wherein additional fractures 310 and 315 connect fractures 116*a* and 116*b* with pre-existing fractures 351 and 350, respectively. This iterative process of diversion resulting in additional fractures and deposition of additional particulates may continue with each subsequent iteration, or, in some embodiments, with at least some of the subsequent iterations, of cycled stages of fluids.

EXAMPLE

Table 1 below provides an example of a pumping schedule for one portion of a fracturing operation according to one embodiment of the methods of the present disclosure. In the pumping schedule in Table 1, the fracturing fluid system used comprises a 30# Hybor G™ fracturing fluid system, a gelled aqueous fluid system available from Halliburton Energy Services, Inc. The proppants used consisted of various sizes of "Premium White" sand, and the diverting agent used consisted of a polylactide diverting agent.

TABLE 1

| Stage No. | Time | Comment | Clean Volume (gal) | Slurry Volume (gal) | Max Treating Pressure (psi) | Avg Treating Pressure (psi) |
|---|---|---|---|---|---|---|
| 1 | 11:34:56 | Load Well | 1457 | 1457 | 6758 | 5722 |
| 2 | 11:38:26 | 15% HCl Acid | 1580 | 1580 | 6811 | 6785 |
| 3 | 11:40:58 | Pre-Pad | 5018 | 5018 | 7158 | 6803 |
| 4 | 11:47:29 | Pad | 30031 | 30031 | 8282 | 7639 |
| 5 | 12:05:14 | Spacer | 1444 | 1444 | 7977 | 7972 |
| 6 | 12:05:55 | 0.50 ppg 30/50 Premium White | 1473 | 1481 | 8027 | 7997 |
| 5 | 12:06:37 | Spacer | 1443 | 1446 | 8033 | 8028 |
| 6 | 12:07:18 | 0.50 ppg 30/50 Premium White | 1460 | 1481 | 8021 | 8020 |
| 5 | 12:08:00 | Spacer | 1408 | 1411 | 8020 | 8014 |
| 6 | 12:08:40 | 0.50 ppg 30/50 Premium White | 1421 | 1445 | 8009 | 8002 |
| 5 | 12:09:21 | Spacer | 1478 | 1482 | 8003 | 7994 |
| 6 | 12:10:03 | 0.50 ppg 30/50 Premium White | 1495 | 1518 | 7981 | 7964 |
|  | 12:10:42 | 1st diverting agent Drop Start | — | — | — | — |
| 7 | 12:10:46 | Spacer with 0.15 ppg diverting agent | 1444 | 1447 | 7962 | 7956 |
| 8 | 12:11:27 | 1.00 ppg 30/50 Premium White & 0.15 ppg diverting agent | 1420 | 1446 | 7982 | 7952 |
| 7 | 12:12:08 | Spacer with 0.15 ppg diverting agent | 1441 | 1445 | 8017 | 8008 |
| 8 | 12:12:49 | 1.00 ppg 30/50 Premium White & 0.15 ppg diverting agent | 1468 | 1517 | 8038 | 8026 |
| 7 | 12:13:32 | Spacer with 0.15 ppg diverting agent | 1477 | 1481 | 8043 | 8031 |
| 8 | 12:14:14 | 1.00 ppg 30/50 Premium White & 0.15 ppg diverting agent | 1398 | 1446 | 8011 | 8007 |
|  | 12:14:50 | 1st diverting agent Drop Stop | — | — | — | — |
| 9 | 12:14:55 | Spacer | 1475 | 1480 | 8010 | 7995 |
| 10 | 12:15:37 | 1.00 ppg 30/50 Premium White | 1395 | 1447 | 7986 | 7974 |
|  | 12:15:56 | 1st diverting agent Drop Downhole | — | — | — | — |
| 11 | 12:16:18 | Spacer | 1477 | 1482 | 7990 | 7977 |
| 12 | 12:17:00 | 1.50 ppg 30/50 Premium White | 1387 | 1446 | 7979 | 7956 |
| 11 | 12:17:41 | Spacer | 1475 | 1481 | 8001 | 7990 |
| 12 | 12:18:23 | 1.50 ppg 30/50 Premium White | 1403 | 1481 | 8038 | 8006 |
| 11 | 12:19:05 | Spacer | 1441 | 1446 | 8041 | 8029 |
| 12 | 12:19:46 | 1.50 ppg 30/50 Premium White | 1401 | 1480 | 8014 | 8002 |
| 13 | 12:20:28 | Spacer | 1439 | 1445 | 8011 | 7969 |
| 14 | 12:21:09 | 2.00 ppg 30/50 Premium White | 1391 | 1480 | 7920 | 7915 |
| 13 | 12:21:51 | Spacer | 1474 | 1481 | 7910 | 7855 |
| 14 | 12:22:33 | 2.00 ppg 30/50 Premium White | 1343 | 1447 | 7802 | 7787 |
|  | 12:23:12 | 2nd diverting agent Drop Start | — | — | — | — |
| 15 | 12:23:14 | Spacer with 0.20 ppg diverting agent | 1475 | 1483 | 7800 | 7749 |
| 16 | 12:23:56 | 2.00 ppg 30/50 Premium White & 0.20 ppg diverting agent | 1342 | 1447 | 7713 | 7684 |
| 15 | 12:24:37 | Spacer with | 1475 | 1483 | 7712 | 7648 |

TABLE 1-continued

| Stage No. | Time | Comment | Clean Volume (gal) | Slurry Volume (gal) | Max Treating Pressure (psi) | Avg Treating Pressure (psi) |
|---|---|---|---|---|---|---|
| 16 | 12:25:19 | 0.20 ppg diverting agent 2.00 ppg 30/50 Premium White & 0.20 ppg diverting agent | 1338 | 1448 | 7619 | 7587 |
|  | 12:25:56 | 2nd diverting agent Drop Stop | — | — | — | — |
| 17 | 12:26:00 | Spacer | 1476 | 1485 | 7620 | 7567 |
| 18 | 12:26:42 | 2.50 ppg 30/50 Premium White | 1332 | 1449 | 7559 | 7514 |
| 17 | 12:27:23 | Spacer | 1474 | 1484 | 7561 | 7515 |
| 18 | 12:28:05 | 2.50 ppg 30/50 Premium White | 1348 | 1483 | 7518 | 7468 |
|  | 12:28:25 | 2nd diverting agent Drop Downhole | — | — | — | — |
| 17 | 12:28:47 | Spacer | 1443 | 1451 | 7519 | 7469 |
| 18 | 12:29:28 | 2.50 ppg 30/50 Premium White | 1348 | 1484 | 7469 | 7418 |
| 17 | 12:30:10 | Spacer | 1442 | 1450 | 7470 | 7418 |
| 18 | 12:30:51 | 2.50 ppg 30/50 Premium White | 1348 | 1485 | 7417 | 7371 |
| 17 | 12:31:33 | Spacer | 1476 | 1485 | 7420 | 7367 |
| 18 | 12:32:15 | 2.50 ppg 30/50 Premium White | 1316 | 1450 | 7377 | 7320 |
| 19 | 12:32:56 | Spacer | 1476 | 1486 | 7381 | 7329 |
| 20 | 12:33:38 | 3.00 ppg 30/50 Premium White | 1276 | 1416 | 7346 | 7286 |
| 19 | 12:34:18 | Spacer | 1475 | 1486 | 7352 | 7302 |
| 20 | 12:35:00 | 3.00 ppg 30/50 Premium White | 1289 | 1450 | 7319 | 7259 |
| 19 | 12:35:41 | Spacer | 1473 | 1485 | 7321 | 7266 |
| 20 | 12:36:23 | 3.00 ppg 30/50 Premium White | 1289 | 1451 | 7277 | 7220 |
| 21 | 12:37:04 | Spacer with 0.21 ppg diverting agent | 1472 | 1484 | 7281 | 7230 |
|  | 12:37:07 | 3rd diverting agent Start | — | — | — | — |
| 22 | 12:37:46 | 3.00 ppg 30/50 Premium White & 0.21 ppg diverting agent | 1313 | 1484 | 7228 | 7176 |
| 23 | 12:38:28 | Spacer with 0.21 ppg diverting agent | 1441 | 1449 | 7228 | 7173 |
| 24 | 12:39:09 | 3.00 ppg 20/40 Premium White & 0.21 ppg diverting agent | 1313 | 1484 | 7187 | 7130 |
| 25 | 12:39:51 | Spacer | 1441 | 1449 | 7188 | 7133 |
|  | 12:39:55 | 3rd diverting agent Drop Stop | — | — | — | — |
| 26 | 12:40:32 | 3.00 ppg 20/40 Premium White | 1317 | 1485 | 7163 | 7103 |
| 25 | 12:41:14 | Spacer | 1439 | 1449 | 7167 | 7107 |
| 26 | 12:41:55 | 3.00 ppg 20/40 Premium White | 1318 | 1485 | 7218 | 7094 |
|  | 12:42:14 | 3rd diverting agent Drop Downhole | — | — | — | — |
| 25 | 12:42:37 | Spacer | 1475 | 1485 | 7234 | 7183 |
| 26 | 12:43:19 | 3.00 ppg 20/40 Premium White | 1201 | 1356 | 7165 | 7072 |
| 27 | 12:44:00 | Spacer | 1314 | 1324 | 7051 | 7011 |
| 28 | 12:44:41 | 3.50 ppg 20/40 Premium White | 1138 | 1288 | 7234 | 7161 |
| 27 | 12:45:18 | Spacer | 1293 | 1302 | 7244 | 7216 |
| 28 | 12:45:55 | 3.50 ppg 20/40 Premium White | 1135 | 1303 | 7193 | 7154 |
| 27 | 12:46:32 | Spacer | 1289 | 1302 | 7214 | 7202 |
| 28 | 12:47:09 | 3.50 ppg 20/40 Premium White | 1166 | 1337 | 7198 | 7170 |
| 27 | 12:47:47 | Spacer | 1292 | 1301 | 7226 | 7215 |
| 28 | 12:48:24 | 3.50 ppg 20/40 Premium White | 1134 | 1301 | 7226 | 7207 |
| 27 | 12:49:00 | Spacer | 1289 | 1300 | 7258 | 7247 |
| 28 | 12:49:37 | 3.50 ppg 20/40 Premium White | 1133 | 1300 | 7258 | 7248 |
| 27 | 12:50:14 | Spacer | 1323 | 1335 | 7280 | 7272 |
| 28 | 12:50:52 | 3.50 ppg 20/40 Premium White | 1158 | 1336 | 7272 | 7259 |
| 27 | 12:51:30 | Spacer | 1292 | 1301 | 7304 | 7292 |
| 28 | 12:52:07 | 3.50 ppg 20/40 Premium White | 1137 | 1303 | 7317 | 7295 |
| 27 | 12:52:44 | Spacer | 1289 | 1301 | 7355 | 7342 |
| 28 | 12:53:21 | 3.50 ppg 20/40 Premium White | 1166 | 1336 | 7353 | 7334 |
| 27 | 12:53:59 | Spacer | 1293 | 1301 | 7378 | 7368 |
| 28 | 12:54:36 | 3.50 ppg 20/40 Premium White | 1134 | 1302 | 7402 | 7377 |
| 29 | 12:55:14 | Spacer | 1290 | 1301 | 7435 | 7422 |
| 30 | 12:55:51 | 4.00 ppg 20/40 Premium White | 1127 | 1302 | 7410 | 7389 |
| 29 | 12:56:28 | Spacer | 1288 | 1300 | 7411 | 7402 |
| 30 | 12:57:05 | 4.00 ppg 20/40 Premium White | 1145 | 1335 | 7403 | 7387 |
| 29 | 12:57:42 | Spacer | 1289 | 1300 | 7383 | 7379 |
| 30 | 12:58:19 | 4.00 ppg 20/40 Premium White | 1111 | 1301 | 7378 | 7361 |
| 29 | 12:58:56 | Spacer | 1288 | 1301 | 7367 | 7363 |
| 30 | 12:59:33 | 4.00 ppg 20/40 Premium White | 1115 | 1301 | 7360 | 7349 |
| 29 | 13:00:10 | Spacer | 1322 | 1337 | 7377 | 7373 |
| 30 | 13:00:48 | 4.00 ppg 20/40 Premium White | 1110 | 1299 | 7367 | 7356 |
| 29 | 13:01:25 | Spacer | 1290 | 1301 | 7371 | 7363 |
| 30 | 13:02:02 | 4.00 ppg 20/40 Premium White | 1113 | 1300 | 7402 | 7369 |
| 29 | 13:02:39 | Spacer | 1287 | 1300 | 7426 | 7418 |
| 30 | 13:03:16 | 4.00 ppg 20/40 Premium White | 1146 | 1336 | 7461 | 7428 |
| 29 | 13:03:54 | Spacer | 1289 | 1299 | 7488 | 7480 |
| 30 | 13:04:31 | 4.00 ppg 20/40 Premium White | 1081 | 1265 | 7498 | 7477 |
| 31 | 13:05:07 | Spacer | 1289 | 1300 | 7515 | 7506 |
| 32 | 13:05:44 | 4.5 ppg 20/40 Premium White | 1080 | 1266 | 7525 | 7506 |
| 31 | 13:06:20 | Spacer | 1288 | 1301 | 7538 | 7514 |
| 32 | 13:06:57 | 4.5 ppg 20/40 Premium White | 1066 | 1264 | 7539 | 7517 |
| 31 | 13:07:33 | Spacer | 1318 | 1335 | 7550 | 7521 |
| 32 | 13:08:11 | 4.5 ppg 20/40 Premium White | 1091 | 1299 | 7522 | 7509 |
| 31 | 13:08:48 | Spacer | 1290 | 1300 | 7502 | 7478 |
| 32 | 13:09:25 | 4.5 ppg 20/40 Premium White | 1065 | 1264 | 7482 | 7470 |
| 31 | 13:10:01 | Spacer | 1287 | 1301 | 7485 | 7469 |
| 32 | 13:10:38 | 4.5 ppg 20/40 Premium White | 1124 | 1334 | 7451 | 7433 |
| 31 | 13:11:16 | Spacer | 1293 | 1302 | 7416 | 7411 |
| 32 | 13:11:53 | 4.5 ppg 20/40 Premium White | 1063 | 1266 | 7414 | 7402 |
| 31 | 13:12:29 | Spacer | 1290 | 1301 | 7392 | 7379 |
| 32 | 13:13:06 | 4.5 ppg 20/40 Premium White | 1066 | 1266 | 7364 | 7355 |
| 31 | 13:13:42 | Spacer | 1288 | 1301 | 7359 | 7352 |
| 32 | 13:14:19 | 4.5 ppg 20/40 Premium White | 1068 | 1265 | 7413 | 7366 |
| 31 | 13:14:55 | Spacer | 1355 | 1371 | 7437 | 7416 |
| 32 | 13:15:34 | 4.5 ppg 20/40 Premium White | 1029 | 1231 | 7405 | 7398 |
| 33 | 13:16:09 | Spacer | 1290 | 1301 | 7396 | 7371 |

TABLE 1-continued

| Stage No. | Time | Comment | Clean Volume (gal) | Slurry Volume (gal) | Max Treating Pressure (psi) | Avg Treating Pressure (psi) |
|---|---|---|---|---|---|---|
| 34 | 13:16:46 | 5.00 ppg 20/40 Premium White | 1057 | 1266 | 7351 | 7341 |
| 33 | 13:17:22 | Spacer | 1288 | 1301 | 7325 | 7298 |
| 34 | 13:17:59 | 5.00 ppg 20/40 Premium White | 1050 | 1266 | 7279 | 7273 |
| 33 | 13:18:35 | Spacer | 1287 | 1302 | 7265 | 7235 |
| 34 | 13:19:12 | 5.00 ppg 20/40 Premium White | 1045 | 1266 | 7213 | 7207 |
| 33 | 13:19:48 | Spacer | 1320 | 1337 | 7203 | 7179 |
| 34 | 13:20:26 | 5.00 ppg 20/40 Premium White | 1045 | 1265 | 7280 | 7232 |
| 35 | 13:21:02 | Spacer | 1290 | 1301 | 7281 | 7267 |
| 36 | 13:21:39 | 5.00 ppg 20/40 Premium White | 2828 | 2958 | 7283 | 7253 |
| 37 | 13:23:03 | XL Flush | 3420 | 3420 | 7444 | 7363 |
| 38 | 13:24:40 | Flush | 11280 | 11280 | 7588 | 7148 |
| 39 | 13:30:52 | Shut-In | 0 | 0 | 0 | 0 |

Figure 4:
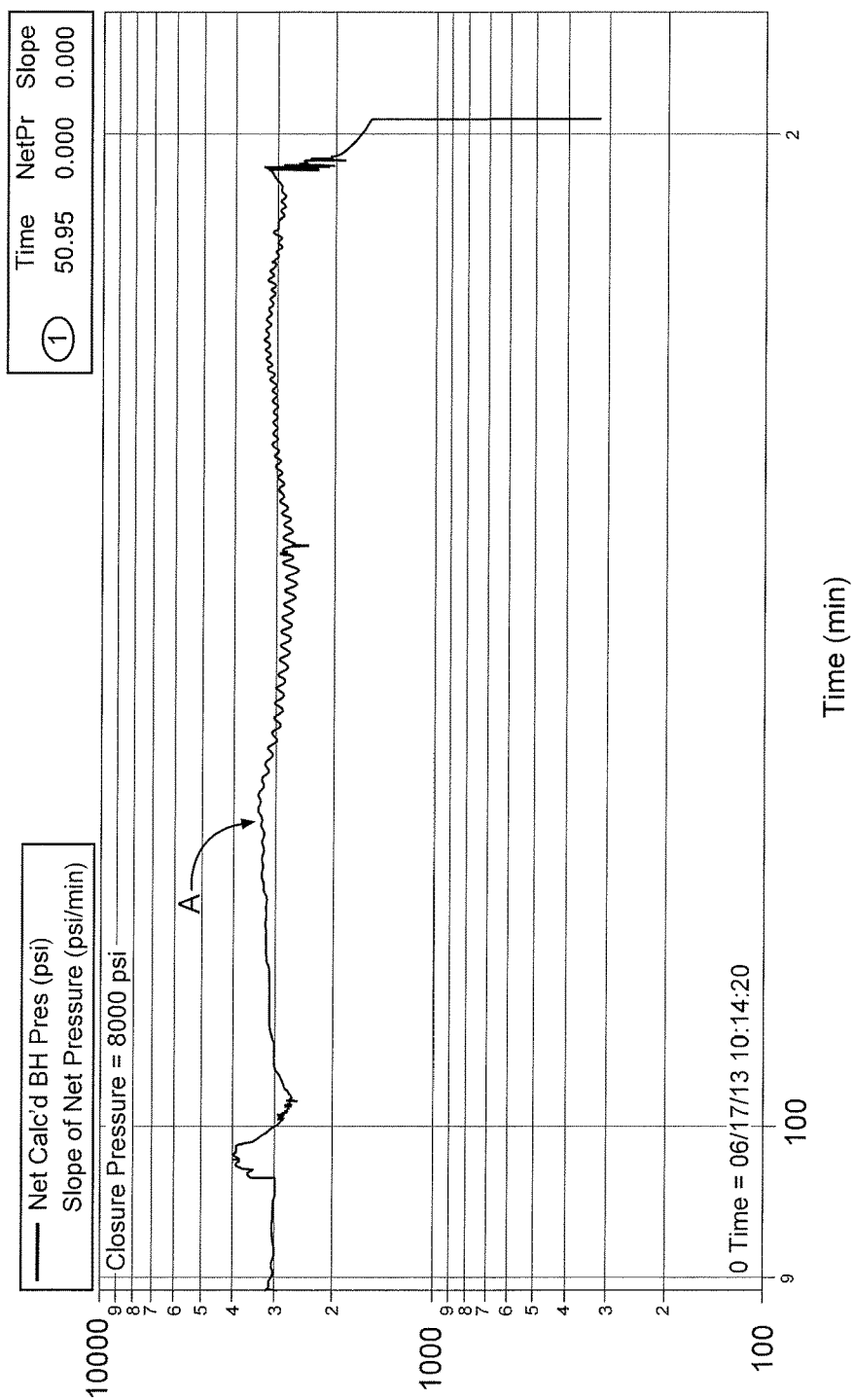
FIG. 4 is a graph illustrating data relating to net bottom-hole pressure in a well in one embodiment of a method of the present disclosure.

FIG. 4 is a plot showing the calculated net bottomhole pressure over time during this operation. As shown, the slope of the pressure change begins to vary after about time A. It is believed that this indicates the time at which the diverting agent begins to divert the flow of fluid in the far field area of the formation. In other applications of the present disclosure, the location of the diverting agent and its effectiveness in diverting fluid into the far field area of the formation may be detected using micro-seismic monitoring techniques.

An embodiment of the present disclosure is a method comprising: introducing into a well bore penetrating a portion of a subterranean formation alternating stages of a proppant-carrying fracturing fluid comprising a plurality of proppant particulates, and a clean fracturing fluid comprising a lesser concentration of proppant particulates than the proppant-carrying fracturing fluid, wherein the alternating stages of the proppant-carrying fracturing fluid and the clean fracturing fluid are introduced into the well bore at or above a pressure sufficient to create or enhance one or more fractures in the subterranean formation; and introducing a diverting agent into the well bore during one or more of the alternating stages of proppant-carrying fracturing fluid and clean fracturing fluid.

Another embodiment of the present disclosure is a method comprising: introducing into a well bore penetrating a portion of a subterranean formation alternating stages of a proppant-carrying fracturing fluid comprising a plurality of proppant particulates, and a clean fracturing fluid comprising a lesser concentration of proppant particulates than the proppant-carrying fracturing fluid, wherein the alternating stages of the proppant-carrying fracturing fluid and the clean fracturing fluid are introduced into the well bore at or above a pressure sufficient to create or enhance one or more fractures in the subterranean formation; and introducing a far-field diverting agent into the well bore.

Another embodiment of the present disclosure is a system comprising: a fracturing fluid source; a proppant source; a diverter source; a pump and blender system comprising a first blender in communication with the fracturing fluid source and the proppant source, a second blender in communication with the fracturing fluid source and the diverter source, one or more pumps in communication with at least one of the first and second blenders configured to pump fluid from the first and second blenders into a well bore penetrating at least a portion of a subterranean formation; and one or more metering devices for selectively controlling the flow of fluid from the first and second blenders into the well bore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   introducing into a well bore penetrating a portion of a subterranean formation alternating stages of
      a proppant-carrying fracturing fluid comprising a plurality of proppant particulates, and
      a clean fracturing fluid comprising a lesser concentration of proppant particulates than the proppant-carrying fracturing fluid,
   wherein the alternating stages of the proppant-carrying fracturing fluid and the clean fracturing fluid are introduced into the well bore at or above a pressure sufficient to create or enhance one or more fractures in the subterranean formation;
      introducing a diverting agent into the well bore during one or more of the alternating stages of proppant-carrying fracturing fluid and clean fracturing fluid,
         wherein the diverting agent is selected from the group consisting of: a fatty alcohol, a fatty acid salt, a fatty ester, a protenious material, and a degradable polymer; and
      allowing the diverting agent to divert at least a portion of a fracturing fluid into a far-field area of the subterranean formation.

2. The method of claim 1 wherein the introduction of the alternating stages of proppant-carrying fracturing fluid and clean fracturing fluid varies the hydrostatic pressure exerted on at least a portion of the formation.

3. The method of claim 1 wherein the subterranean formation comprises at least one type of rock formation selected from the group consisting of shale, clay, coal beds, gas sands, and any combination thereof.

4. The method of claim 1 wherein the diverting agent comprises a degradable diverting agent.

5. The method of claim 1 wherein the particles of the diverting agent have an average particle size of from about 1 micron to about 600 microns.

6. The method of claim 1 wherein the volumes of the alternating stages of proppant-carrying fracturing fluid and clean fracturing fluid are from about 500 gallons to about 5000 gallons.

7. The method of claim 1 wherein the proppant-carrying fracturing fluid and clean fracturing fluid comprise one or more gelling agents.

8. The method of claim 1 wherein the clean fracturing fluid is substantially free of proppant.

9. A method comprising:
   introducing into a well bore penetrating a portion of a subterranean formation alternating stages of
      a proppant-carrying fracturing fluid comprising a plurality of proppant particulates, and
      a clean fracturing fluid comprising a lesser concentration of proppant particulates than the proppant-carrying fracturing fluid,
      wherein the alternating stages of the proppant-carrying fracturing fluid and the clean fracturing fluid are introduced into the well bore at or above a pressure sufficient to create or enhance one or more fractures in the subterranean formation; and
   introducing a far-field diverting agent into the well bore, wherein the average particle size of the far-field diverting agent is from about 1 micron to about 600 microns.

10. The method of claim 9 wherein the far-field diverting agent is introduced into the well bore during one or more of the alternating stages of proppant-carrying fracturing fluid and clean fracturing fluid.

11. The method of claim 9 further comprising allowing the far-field diverting agent to divert at least a portion of a fracturing fluid into a far-field area of the subterranean formation.

12. The method of claim 9 wherein the introduction of the alternating stages of proppant-carrying fracturing fluid and clean fracturing fluid varies the hydrostatic pressure exerted on at least a portion of the formation.

13. The method of claim 9 wherein the volumes of the alternating stages of proppant-carrying fracturing fluid and clean fracturing fluid are from about 500 gallons to about 5000 gallons.

14. The method of claim 9 wherein the far-field diverting agent comprises a degradable diverting agent.

15. A system for conducting a fracturing operation, the system comprising:
   a fracturing fluid source;
   a proppant source;
   a diverter source;
   a pump and blender system comprising
      a first blender in communication with the fracturing fluid source and the proppant source,
      a second blender in communication with the fracturing fluid source and the diverter source,
      one or more pumps in communication with at least one of the first and second blenders configured to pump fluid from the first and second blenders into a well bore penetrating at least a portion of a subterranean formation; and
      one or more metering devices for selectively controlling the flow of fluid from the first and second blenders into the well bore.

16. The system of claim 15 wherein
   at least one metering device is located in communication with the first blender to selectively control the flow of fluid from the first blender to produce alternating stages of a proppant-carrying fracturing fluid comprising a plurality of proppant particulates from the proppant source, and a clean fracturing fluid comprising a lesser concentration of proppant particulates than the proppant-carrying fracturing fluid; and
   the second blender is configured to introduce a diverting agent from the diverter source into the well bore without interrupting operation of the first blender.

17. The system of claim 15 wherein the pump and blender system is configured to separately introduce proppant from the proppant source and a diverting agent from the diverter source into the well bore at substantially the same time.

18. The system of claim 15 wherein the pump and blender system is configured to pump fluid into the well bore penetrating at least the portion of the subterranean formation at or above a pressure sufficient to create or enhance one or more fractures in the subterranean formation.

* * * * *